C. O. HAMMONTREE AND V. A. NELSON.
PISTON RING REMOVER AND INSERTER.
APPLICATION FILED JULY 11, 1919.
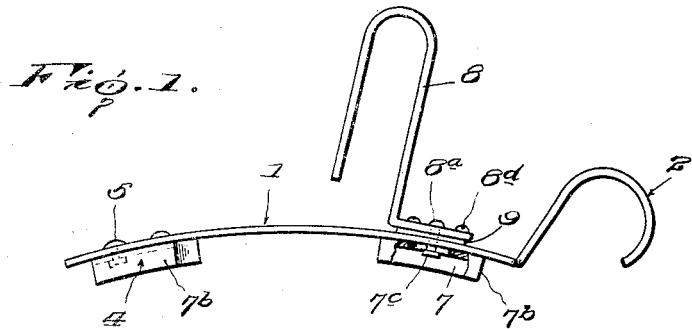
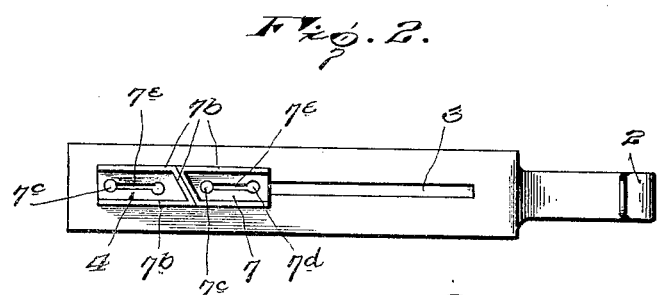
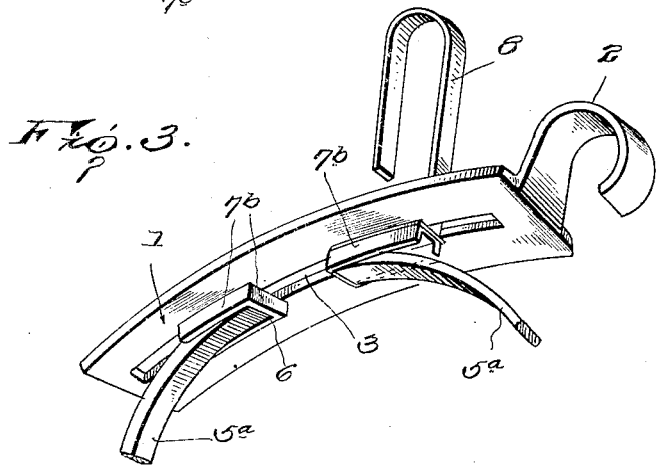

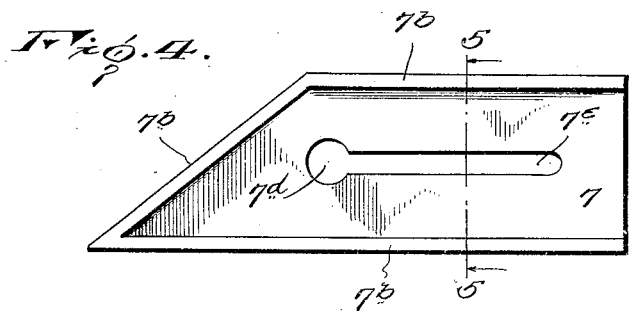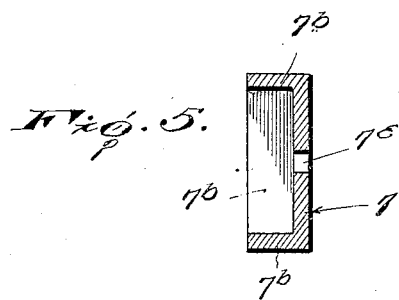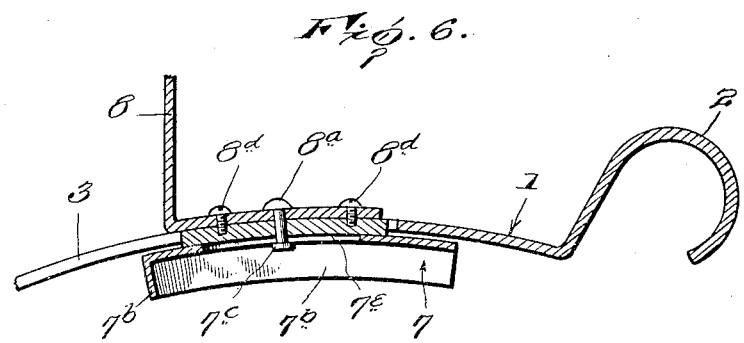

UNITED STATES PATENT OFFICE.

CHARLES O. HAMMONTREE AND VICTOR A. NELSON, OF BREMERTON, WASHINGTON.

PISTON-RING REMOVER AND INSERTER.

1,337,600.   Specification of Letters Patent.   Patented Apr. 20, 1920.

Application filed July 11, 1919. Serial No. 310,272.

*To all whom it may concern:*

Be it known that we, CHARLES O. HAMMONTREE and VICTOR A. NELSON, citizens of the United States, residing at Bremerton, in the county of Kitsap and State of Washington, have invented certain new and useful Improvements in Piston-Ring Removers and Inserters, of which the following is a specification.

This invention relates to improvements in piston ring removers.

The object of the invention is to provide a simple and economical tool, by means of which a piston ring may be quickly and easily removed from a piston head without scratching, marring, or otherwise disfiguring the same.

The invention also comprehends improvements in the details of construction and arrangement of parts which will be hereinafter described and particularly pointed out in the claim.

In the drawings Figure 1 is top plan view of our improved tool in open position. Fig. 2 is an elevation looking from the inner side, the jaws being in closed position. Fig. 3 is a detail perspective view showing the tool in operative engagement with a piston ring. Fig. 4 is an enlarged detail plan of one of the jaws. Fig. 5 is a detail section taken upon the line 5—5 of Fig. 4 looking in the direction of the arrow. Fig. 6 is detail enlarged section taken on the line 6—6 of Fig. 2.

Referring now more particularly to the drawings, numeral 1 indicates the body of the tool, formed on one end with a handle 2. The body is provided with a closed longitudinal slot 3. 4 indicates a jaw which connected to the body 1 by means of a rivet 5, and 7 indicates a companion jaw. One end of the jaw 4 is angularly shaped to receive the beveled end of a piston ring $5^a$, as shown in Fig. 3, the beveled ends of the ring $5^a$, being indicated at 6. This jaw is flanged on the sides to form a pocket to receive the end of the ring. The jaw 7 is flanged on three sides, as at $7^B$, to form a pocket for the opposite end of the ring. The end of the jaw in this instance is angular to fit the angular end of a piston ring.

It will be understood, of course, that if rings having square ends are to be dealt with, the jaws 4 and 7 will be correspondingly shaped.

We prefer to use a reasonable number of sizes of tools to deal with the various sizes of piston rings, but in emergency a tool fitting a 4-inch piston ring for example, might be used on a $3\frac{3}{4}$-inch piston ring, the only difference being, that in the use of the tool on a $3\frac{3}{4}$-inch piston ring, the operator would have to take care not to overspread the ring with a resultant danger of breaking the same, whereas in dealing with the 4-inch ring he need not exercise such care, inasmuch as the movement of the jaw 7 will be limited by the length of the slot 3 in exact proportion to allow full expansion of the ring without breaking or setting the same. It might also occur that the jaws 4 and 7 of angular form would have to be changed to deal with piston rings having square ends. To do this in the case of the jaw 7, the handle 8 is placed in the position shown in Fig. 1, and held there by the operator while he moves the jaw to the left, or until the head $7^c$ of the rivet $8^a$ registers with the enlarged portion $7^d$, of the slot $7^e$, which permits the removal of the jaw 7. A jaw having a similar aperture but having a square end, can now be inserted. The jaw 4 is similarly removed from the body 1, as will be understood.

The jaw 7 is fixed to a block 9 by means of a rivet $8^d$. The block 9 is slidable within the slot 3, the base of the handle 8 being wider than the slot 3, thereby assisting to hold the parts in place, as shown in Fig. 6.

The extreme end walls of the slot 3 form stops to limit the movement of the jaws so that the operator need not hesitate in unduly spreading the ring for fear of breaking the same, inasmuch as the relation of the slot 3 to the piston ring $5^a$ is definitely fixed to limit the movement of the cleats within bounds of safety for the different sizes of pistons to be dealt with. For example, if the diameter of the piston ring and the length of the slot 3 are predetermined, it allows the jaws 4 and 7 to move no farther than would cause the spreading of the ring to lift it from the piston head, and at the same time prevents excess movement of the jaw so as not to spread the ring to the breaking point.

From the above it will be seen that if an operator desires to remove a piston ring from its seat in a piston head, all that is necessary to do, is to move the jaws together by means of the handles 8 and 2, as shown in Fig. 2, so that they may be inserted in the angular gap between the ends of the piston ring 5ª, and then draw the handle 8, toward the handle 2, which will separate the jaws 4 and 7, thus spreading the ring 5ª to a sufficient diameter to allow an easy and quick removal of the same from its seat in the piston head.

Having described our invention, what we claim as new and desire to protect by Letters Patent is:—

A tool for removing piston rings comprising a curved plate-like body having a fixed handle at one end, said body being formed with a longitudinally arranged slot closed at each end, a jaw removably secured to the body in line with the slot, a plate slidably mounted in the slot, a handle secured to said plate and projecting away from the body, a second jaw and means connecting said second jaw to the plate to permit relative sliding movement of such jaw for disconnection from the plate.

In testimony whereof we affix our signatures.

CHARLES O. HAMMONTREE.
VICTOR A. NELSON.